United States Patent
Li (10) Patent No.: US 10,719,293 B2
(45) Date of Patent: Jul. 21, 2020

(54) INTERACTIVE CONTROL METHOD AND DEVICE FOR VOICE AND VIDEO COMMUNICATIONS

(71) Applicant: BAIDU ONLINE NETWORK TECHNOLOGY (BEIJING) CO., LTD., Beijing (CN)

(72) Inventor: Feng Li, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 73 days.

(21) Appl. No.: 15/752,489

(22) PCT Filed: Dec. 3, 2015

(86) PCT No.: PCT/CN2015/096340
§ 371 (c)(1),
(2) Date: Feb. 13, 2018

(87) PCT Pub. No.: WO2017/054309
PCT Pub. Date: Apr. 6, 2017

(65) Prior Publication Data
US 2018/0260189 A1  Sep. 13, 2018

(30) Foreign Application Priority Data
Sep. 28, 2015 (CN) .......................... 2015 1 0629549

(51) Int. Cl.
*G10L 15/22* (2006.01)
*G06F 3/16* (2006.01)
(Continued)

(52) U.S. Cl.
CPC .............. *G06F 3/167* (2013.01); *G06F 3/005* (2013.01); *G06F 3/017* (2013.01); *G06F 3/0304* (2013.01);
(Continued)

(58) Field of Classification Search
None
See application file for complete search history.

(56) References Cited

U.S. PATENT DOCUMENTS

2011/0173574 A1* 7/2011 Clavin .................... G06F 3/017
715/863
2013/0226580 A1* 8/2013 Witt-Ehsani .......... G10L 15/063
704/244
(Continued)

FOREIGN PATENT DOCUMENTS

CN 102170617 8/2011
CN 103152244 6/2013
(Continued)

OTHER PUBLICATIONS

JPO, Office Action for JP Application No. 2018510102, dated Dec. 21, 2018.
(Continued)

*Primary Examiner* — Abul K Azad
(74) *Attorney, Agent, or Firm* — Hodgson Russ LLP (57) ABSTRACT

The present invention discloses an interactive control method and device for voice and video communications. The method includes: acquiring user action data inputted by a user in a preset manner, in which the preset manner includes a voice manner and/or a gesture manner; determining whether the user action data includes preset trigger information; and when the user behavior data comprises the preset trigger information, determining an operation instruction corresponding to the preset trigger information in a preset operation instruction set, and performing an event corresponding to the operation instruction.

12 Claims, 5 Drawing Sheets

(51) Int. Cl.
*G06F 3/00* (2006.01)
*G06F 3/03* (2006.01)
*G06F 3/01* (2006.01)
*G06K 9/00* (2006.01)
*G10L 15/08* (2006.01)

(52) U.S. Cl.
CPC ........ *G06K 9/00335* (2013.01); *G10L 15/08* (2013.01); *G10L 15/22* (2013.01); *G10L 2015/088* (2013.01); *G10L 2015/223* (2013.01)

(56) References Cited

U.S. PATENT DOCUMENTS

| | | | |
|---|---|---|---|
| 2014/0188477 A1* | 7/2014 | Zhang | G10L 15/22 704/257 |
| 2014/0244269 A1* | 8/2014 | Tokutake | G10L 15/00 704/275 |
| 2015/0039303 A1* | 2/2015 | Lesso | G10L 15/28 704/233 |
| 2015/0088514 A1 | 3/2015 | Typrin | |
| 2015/0095856 A1 | 4/2015 | Liu et al. | |
| 2015/0243287 A1* | 8/2015 | Nakano | G10L 15/30 704/246 |

FOREIGN PATENT DOCUMENTS

| | | |
|---|---|---|
| CN | 103513752 | 1/2014 |
| CN | 103576839 | 2/2014 |
| CN | 104010154 | 8/2014 |
| CN | 104252860 | 12/2014 |
| CN | 104618220 | 5/2015 |
| JP | 2007018456 | 1/2007 |
| JP | 2008269174 | 11/2008 |
| WO | 2015043189 | 4/2015 |

OTHER PUBLICATIONS

English translation of the ISR/WO for PCT Application CN2015096340, Jun. 13, 2016.

* cited by examiner

Fig. 6

INTERACTIVE CONTROL METHOD AND DEVICE FOR VOICE AND VIDEO COMMUNICATIONS

CROSS-REFERENCE TO RELATED APPLICATIONS

This application is a U.S. national phase application of International Application No. PCT/CN2015/096340, filed on Dec. 3, 2015, which claims a priority to Chinese Patent Application No. 201510629549.1, filed with the State Intellectual Property Office of P. R. China on Sep. 28, 2015, titled with "interactive control method and device for voice and video communication", filed by BAIDU ONLINE NETWORK TECHNOLOGY (BEIJING) CO., LTD., the entire contents of which are incorporated herein by reference.

FIELD

The present disclosure relates to an internet technology field, and more particularly, to an interactive control method and device for voice and video communication.

BACKGROUND

With rapid development of internet technology, IM (instant messaging) tools (such as WeChat, QQ, etc.) are increasingly applied in people's life and work. The IM tool (IM software) has become a communication tool in people's life. In a process of using the IM software, users can communicate with IM friends or chat groups through text, voice and video.

When the user is chatting with a friend through video, if the user needs to perform some operations, the user usually performs the corresponding operations manually. For example, when the user needs to adjust a size of a video window, the user needs to operate a mouse to adjust the size of the video window. For another example, when the user needs a remote chat user to help to select a most beautiful picture and the pictures are stored in a remote cloud, the user needs to download the remote pictures locally and transmit the pictures to the chat user, and the chat user receives the pictures, clicks to view, and then tells the selection result to the user.

However, in the process of video communication, sometimes it is inconvenient for the user to manually perform some operations. Because the interactive control manner in the related art is relatively simple, the user cannot release his/her hands during the video communication, thus the interactive experience of the user is not ideal.

SUMMARY

The present disclosure aims to solve at least one of the technical problems in the related art to at least some extent.

Accordingly, a first objective of the present disclosure is to provide an interactive control method for voice and video communication.

A second objective of the present disclosure is to provide an interactive control device for voice and video communication.

A third objective of the present disclosure is to provide an interactive control device for voice and video communication.

A fourth objective of the present disclosure is to provide a storage medium.

In order to achieve the above objectives, embodiments of a first aspect of the present disclosure provide an interactive control method for voice and video communication, including: acquiring user behavior data inputted by a user in a preset manner, in which the preset manner includes a voice manner and/or a gesture manner; determining whether the user behavior data includes preset trigger information; and when the user behavior data includes the preset trigger information, determining an operation instruction corresponding to the preset trigger information in a preset operation instruction set, and performing an event corresponding to the operation instruction.

In order to achieve the above objectives, embodiments of a second aspect of the present disclosure provide an interactive control device for voice and video communication, including: an acquiring module, configured to acquire user behavior data inputted by a user in a preset manner, in which the preset manner includes a voice manner and/or a gesture manner; a determining module, configured to determine whether the user behavior data includes preset trigger information; and a processing module, configured to determine an operation instruction corresponding to the preset trigger information in a preset operation instruction set when the user behavior data includes the preset trigger information and to perform an event corresponding to the operation instruction.

In order to achieve the above objectives, embodiments of a third aspect of the present disclosure provide an interactive control device for voice and video communication, including one or more processors, a memory and one or more modules stored in the memory. When the one or more modules are executed by the one or more processors, the one or more modules are configured to perform operations: acquiring user behavior data inputted by a user in a preset manner, in which the preset manner includes a voice manner and/or a gesture manner; determining whether the user behavior data includes preset trigger information; and when the user behavior data includes the preset trigger information, determining an operation instruction corresponding to the preset trigger information in a preset operation instruction set, and performing an event corresponding to the operation instruction.

In order to achieve the above object, embodiments of a fourth aspect of the present disclosure provide a storage medium. The storage medium is configured to store an application program. The application program is configured to perform the interactive control method for voice and video communication according to the embodiments of the first aspect of the present disclosure.

DETAILED DESCRIPTION

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

In the following, the interactive control method and device for voice and video communication provided by embodiments of the present disclosure will be described with reference to the drawings.

Figure 1:
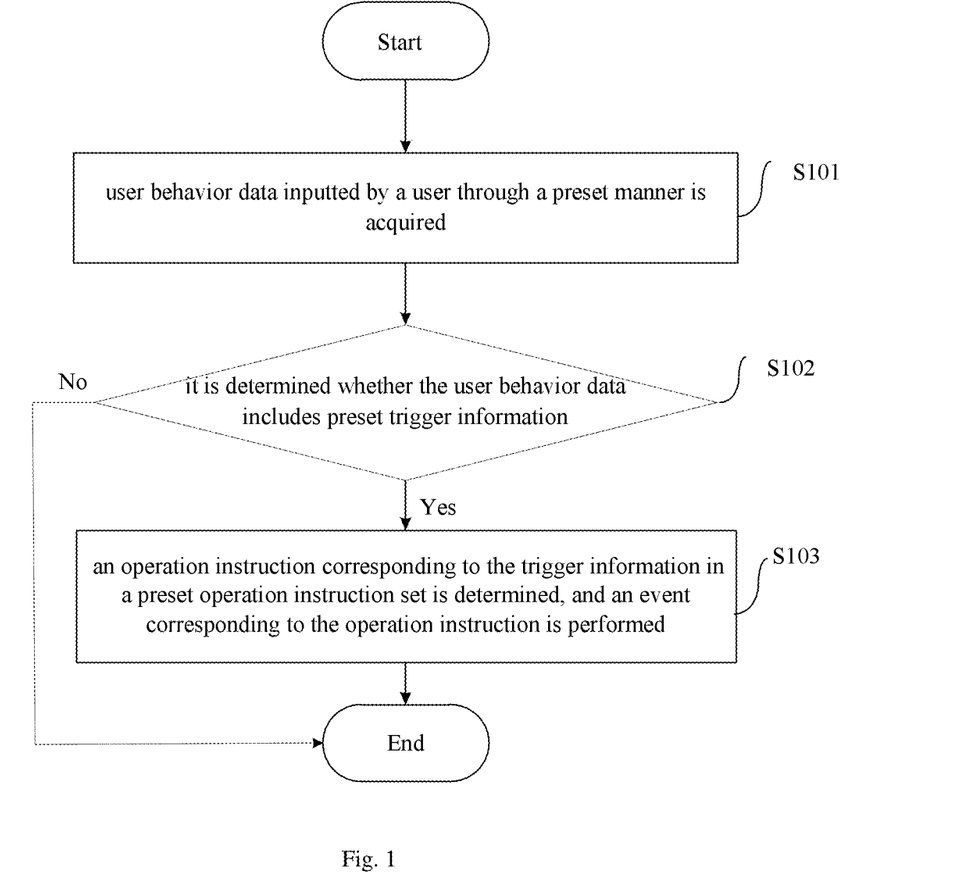
FIG. 1 is a flow chart of an interactive control method for voice and video communication according to an embodiment of the present disclosure.

FIG. 1 is a flow chart of an interactive control method for voice and video communication according to an embodiment of the present disclosure.

As illustrated in FIG. 1, the interactive control method for voice and video communication includes followings.

At block S101, user behavior data inputted by a user in a preset manner is acquired.

The preset manner includes a voice manner and/or a gesture manner.

In detail, during a voice call between the user and one or more other users, voice data inputted by the user can be monitored in order to perform some operations according to the voice data inputted by the user.

In addition, during the video call between the user and one or more other users, in order to perform some operations according to voice data or the gesture action inputted by the user, while monitoring the voice data inputted by the user, a camera of the terminal may also be monitored to acquire the gesture action inputted by the user according to video information collected by the camera.

At block S102, it is determined whether the user behavior data includes preset trigger information.

In order to reduce the influence on normal voice or video call of the user, when the user needs the terminal to automatically perform some operations according to the voice or the gesture inputted by himself/herself, the user can input a trigger word or trigger action that trigger an application to control the terminal to perform some operations, the application can acquire voice or gesture action inputted by the user after the trigger word or the trigger action, and perform some operations according to the voice or gesture action.

The preset trigger information may include, but is not limited to, a trigger word, an action operation word, a keyword, a trigger gesture action and a gesture action.

In an embodiment of the present disclosure, when it is monitored that the user inputs the user behavior data in the voice manner, it can be determined whether the user behavior data includes a preset trigger word. When it is determined that the preset trigger word is included, it is further determined whether the user behavior data includes a preset action operation word. It should be understood that, in this case, the user behavior data is voice data.

In addition, in the process of chatting by the user through the video call, the user behavior data inputted by the user may be acquired through the camera. After the user behavior data is acquired, it can be determined whether the user behavior data includes a preset trigger gesture action. When it is determined that the preset trigger gesture action is included, it is further determined whether the user behavior data includes a preset gesture action.

At block S103, when it is determined that the preset trigger information is included, an operation instruction corresponding to the preset trigger information and in a preset operation instruction set is determined, and an event corresponding to the operation instruction is performed.

It should be understood that, the correspondence relationship between the preset trigger information, the operation instruction and the event is stored in advance.

For example, during a video call between a user A and a user B, it is assumed that a reserved voice instruction (the trigger word) that triggers the application to perform some operations according to the voice data inputted by the user is "X voice assistant", i.e., when the voice data inputted by the user includes "X voice assistant", the voice data after "X voice assistant" may be recognized, to determine whether the preset action operation word is included in the voice data after "X voice assistant" inputted by the user. Assuming that the voice data currently inputted by the user is "X voice assistant, downloading pictures x.jpg and y.jpg from Baidu cloud, sending the downloaded pictures to the user B for his/her selection", the voice data inputted by the user may be analyzed by the related art, to obtain an analysis result of the voice data, and it is determined whether the analysis result includes the preset action operation word. When the preset action operation word is included, then the operation instruction corresponding to the preset action operation word is acquired, and the corresponding operation is performed according to the operation instruction.

For another example, during the video call between the user A and the user B, it is assumed that the reserved action instruction that triggers the application to perform some operations according to the gesture action inputted by the user is a gesture indicating "OK", i.e., in the process of analyzing the video information collected by the camera, when it is analyzed that the video information collected by the camera includes the gesture indicating "OK", it can be determined that the video information includes the trigger action that triggers the application to perform some operations according to the gesture action inputted by the user. In this case, when it is monitored that the user inputs a gesture indicating "magnifying" after inputting the trigger action and it is determined that the gesture action currently inputted by the user is the preset gesture action by analyzing the video information collected by the camera, the operation instruction corresponding to the gesture indicating "magnifying" can be obtained. Assuming that the operation instruction corresponding to the gesture indicating "magnifying" is an instruction to maximize the window, the application performs the event that maximizes the video window according to the operation instruction.

In addition, in an embodiment of the present disclosure, in the process of determining the operation instruction corresponding to the action operation word according to the preset operation instruction set and performing the event corresponding to the operation instruction corresponding to the action operation word, when multiple events are obtained, the multiple events are provided to the user for confirmation.

In detail, in the process of performing events according to the voice data inputted by the user, there may be a case in which the user's instruction is not clear. In this case, multiple events may be obtained when intending to perform the event according to the voice data. Therefore, before the corresponding event is performed, it is possible to number the multiple events and display the events, the numbers and prompt information for confirming the event, to prompt the user to confirm the event.

For example, the user's voice data is "opening a photo on the desktop", when there is a folder called "photo" and also a file "photo.jpg" on the desktop, in the process of performing events according to the voice data inputted by the user, it may not be clearly determine whether the user want to open the folder "photo" on the desktop or open the file "photo.jpg" on the desktop. Therefore, in this case, two options may be displayed to the user for confirmation after analysis. In order to correctly recognize user's confirmation, it can be recognized by a confirm password of each option. Assuming that confirm text for the option of opening the folder "photo" on the desktop is "confirming photo option 1", and confirm text for the option of opening the file "photo.jpg" on the desktop is "confirming photo option 2", when the application receives the user's voice input "confirming photo option 1", the application may determine that the user needs to perform the event of opening the folder "photo" on the desktop according to the voice data currently inputted by the user, and automatically open the folder "photo" on the desktop for the user.

With the interactive control method for voice and video communication provided by embodiments of the present disclosure, the user behavior data inputted by the user in the voice manner and/or the gesture manner is acquired, it is determined whether the user behavior data includes the preset trigger information, and when it is determined that the trigger information is included, the operation instruction corresponding to the trigger information and in the preset operation instruction set is determined, and the event corresponding to the operation instruction is performed, such that, the user can control the terminal to perform other operations through the voice and/or the gesture during the voice and/or video communication, thereby avoiding the trouble of manual operation of the user and improving the interactive experience of the user.

Figure 2:
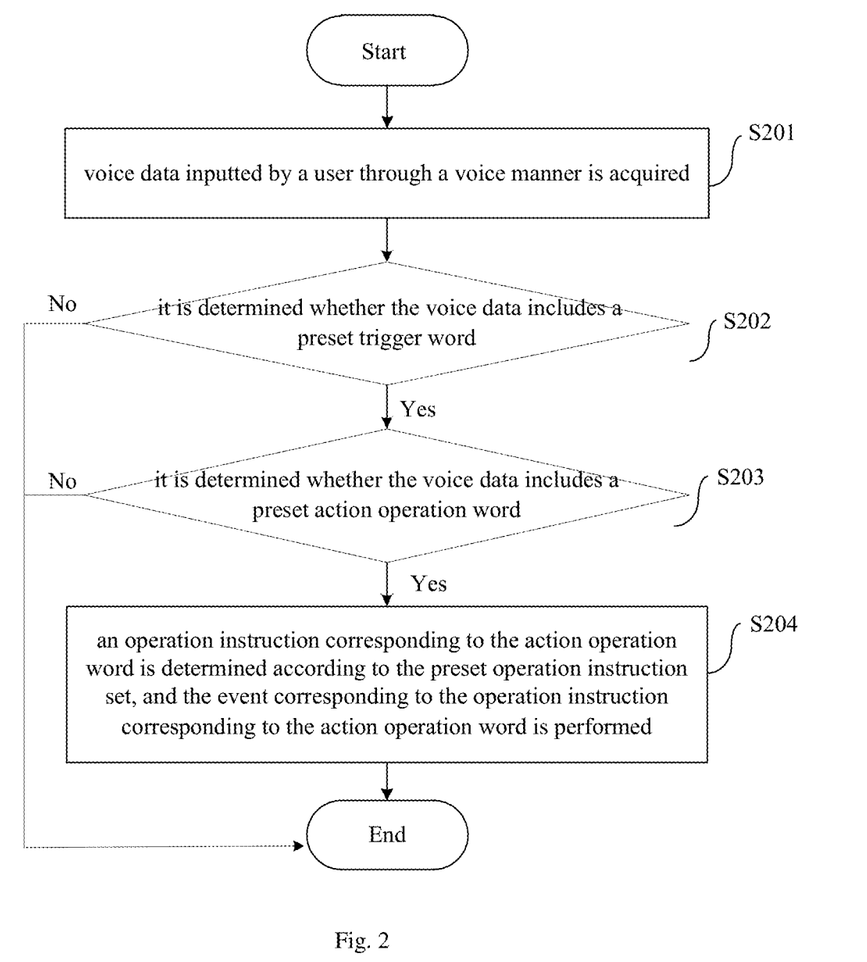
FIG. 2 is a flow chart of an interactive control method for voice and video communication according to another embodiment of the present disclosure.

FIG. 2 is a flow chart of an interactive control method for voice and video communication according to another embodiment of the present disclosure.

As illustrated in FIG. 2, the interactive control method for voice and video communication includes followings.

At block S201, voice data inputted by a user in a voice manner is acquired.

In detail, during the voice or video call between the user and one or more other users, the voice data inputted by the user can be monitored.

At block S202, it is determined whether the voice data includes a preset trigger word.

At block S203, it is further determined whether the voice data includes a preset action operation word when it is determined that the preset trigger word is included.

In detail, after the voice data inputted by the user is obtained, the voice data may be analyzed by the related art, to obtain the analysis result corresponding to the voice data. It is determined whether the analysis result includes the preset trigger word. When it is determined that the preset trigger word is included, it is further determined whether the preset action operation word is included.

At block S204, when it is determined that the preset action operation word is included, an operation instruction corresponding to the preset action operation word is determined according to the preset operation instruction set, and the event corresponding to the operation instruction corresponding to the preset action operation word is performed.

For example, during the video call between the user A and the user B, it is assumed that the reserved voice instruction (the trigger word) that triggers the application to perform some operations according to the voice data inputted by the user is "X voice assistant", i.e., when the voice data inputted by the user includes "X voice assistant", the voice data after "X voice assistant" may be recognized, to determine whether the preset action operation word is included in the voice data after "X voice assistant" inputted by the user. Assuming that the voice data currently inputted by the user is "X voice assistant, downloading pictures x.jpg and y.jpg from Baidu cloud, sending the downloaded pictures to the user B for his/her selection", the voice data is analyzed, and it is determined whether the analysis result includes the trigger word, it can be determined that the voice data currently inputted by the user includes the trigger word. It may be further determined whether the analysis result includes the preset action operation word, it can be determined that the action operation words "downloading" and "sending" are included, the operation instruction corresponding to the action operation words is obtained, and the corresponding event is performed according to the operation instruction, i.e., the pictures x.jpg and y.jpg are downloaded from the Baidu cloud and then the pictures x.jpg and y.jpg are sent to the user B. Thus, the user can control the terminal to perform operations of downloading and sending the pictures in the voice manner, thereby reducing the trouble of manually downloading and sending the pictures by himself/herself.

In addition, in an embodiment of the present disclosure, in the process of determining the operation instruction corresponding to the action operation word according to the preset operation instruction set and performing the event corresponding to the operation instruction corresponding to the action operation word, when multiple events are obtained, the multiple events are provided to the user for confirmation.

In detail, in the process of performing events according to the voice data inputted by the user, there may be a case in which the user's instruction is not clear. In this case, multiple events may be obtained when intending to perform the event according to the voice data. Therefore, before the corresponding event is performed, it is possible to number the multiple events, and display the events, the numbers and prompt information for confirming the event, to prompt the user to confirm the event.

For example, the user's voice data is "opening a photo on the desktop", when there is a folder called "photo" and also a file "photo.jpg" on the desktop, in the process of performing events according to the voice data inputted by the user, it may not be clearly determine whether the user want to open the folder "photo" on the desktop or open the file "photo.jpg" on the desktop. Therefore, in this case, two options may be displayed to the user for confirmation after analysis. In order to correctly recognize user's confirmation, it can be recognized by a confirm password of each instruction. Assuming that confirm text after "opening the folder 'photo' on the desktop" is "confirming photo option 1", and confirm text after "opening the file 'photo.jpg' on the desktop" is "confirming photo option 2", when the application receives the user's voice input "confirming photo option 1", the application may determine that the user needs to perform the event of "opening the folder 'photo' on the desktop" according to the voice data currently inputted by the user, and automatically open the folder "photo" on the desktop for the user.

With the interactive control method for voice and video communication provided by embodiments of the present disclosure, the user behavior data inputted by the user in the voice manner is acquired, it is determined whether the user behavior data includes the preset trigger information, and when it is determined that the trigger information is included, the operation instruction corresponding to the trigger information and in the preset operation instruction set is determined, and the event corresponding to the operation instruction is performed, such that, the user can control the terminal to perform other operations through the voice during the voice and/or video communication, thereby avoiding the trouble of manual operation of the user and improving the interactive experience of the user.

Figure 3:
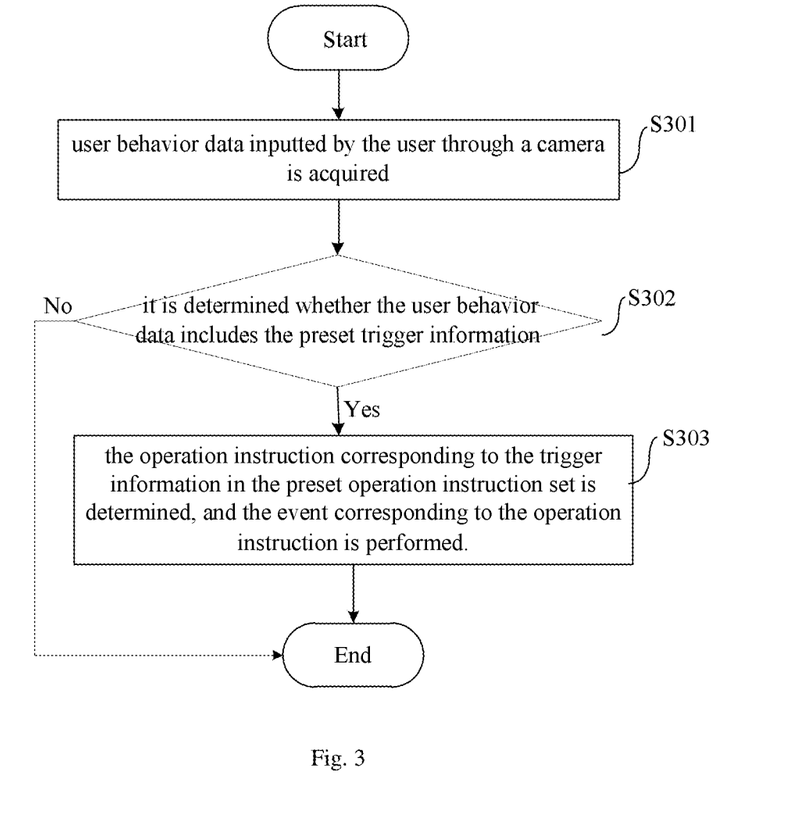
FIG. 3 is a flow chart of an interactive control method for voice and video communication according to yet another embodiment of the present disclosure.

FIG. 3 is a flow chart of an interactive control method for voice and video communication according to yet another embodiment of the present disclosure.

As illustrated in FIG. 3, the interactive control method for voice and video communication includes followings.

At block S301, user behavior data inputted by the user through a camera is acquired.

In detail, during the video call between the user and one or more other users, sine the user may input action instructions through the gesture action, the camera of the terminal may be monitored, and the video information collected by the camera may be obtained.

At block S302, it is determined whether the user behavior data includes the preset trigger information.

In an embodiment of the present disclosure, after the user behavior data is obtained through the camera, it can be determined whether the user behavior data includes a preset trigger gesture action. When it is determined that the preset trigger gesture action is included, it is further determined whether the user behavior data includes a preset gesture operation.

In detail, after the video information collected by the camera is obtained, the video information may be recognized through a related video algorithm, and it is determined whether the video information includes the trigger gesture action that triggers the application to perform some operations according to the gesture operation inputted by the user. When the trigger gesture action is included, it is further determined whether the gesture operation inputted by the user after the trigger gesture action is the preset gesture operation.

At block S303, when it is determined that the preset trigger information is included, an operation instruction corresponding to the preset trigger information and in the preset operation instruction set is determined, and the event corresponding to the operation instruction is performed.

For example, during the video call between the user A and the user B, it is assumed that the reserved action instruction that triggers the application to perform some operations according to the gesture operation inputted by the user is a gesture indicating "OK", i.e., in the process of analyzing the video information collected by the camera, when it is analyzed that the video information collected by the camera includes the gesture indicating "OK", it can be determined that the video information includes the trigger action that triggers the application to perform some operations according to the gesture operation inputted by the user. In this case, when it is monitored that the user inputs a gesture indicating "magnifying" after inputting the trigger action and it is determined that the gesture operation currently inputted by the user is the preset gesture operation by analyzing the video information collected by the camera, the operation instruction corresponding to the gesture indicating "magni- fying" can be obtained. Assuming that the operation instruction corresponding to the gesture indicating "magnifying" is an instruction to maximize the window, the application performs the event that maximizes the video window according to the operation instruction. Thus, the user can adjust the size of the video window through the gesture operation during the video process, thereby reducing the trouble of manual operation of the user.

It should be noted that, adjusting the size of the video window by the gesture operation is only an example of the present disclosure. The user may also control the terminal to perform other operations through the gesture operation. For example, the user may control the closing of the video window through the gesture operation.

With the interactive control method for voice and video communication provided by embodiments of the present disclosure, the user behavior data inputted by the user is acquired through the camera, it is determined whether the user behavior data includes the preset trigger information, and when it is determined that the trigger information is included, the event corresponding to the trigger information is performed according to the preset operation instruction, such that, the user can control the terminal to perform other operations through gesture during the video communication, thereby avoiding the trouble of manual operation of the user and improving the interactive experience of the user.

During the interaction between the user and other users through the voice or video communication, not only the terminal can be controlled to perform some operations according to the voice data inputted by the user, but also recommendation information related to a keyword can be recommended to the user according to the keyword in the voice data, so as to accurately push information to the user, thus facilitating the user to obtain the information related to the keyword.

Figure 4:
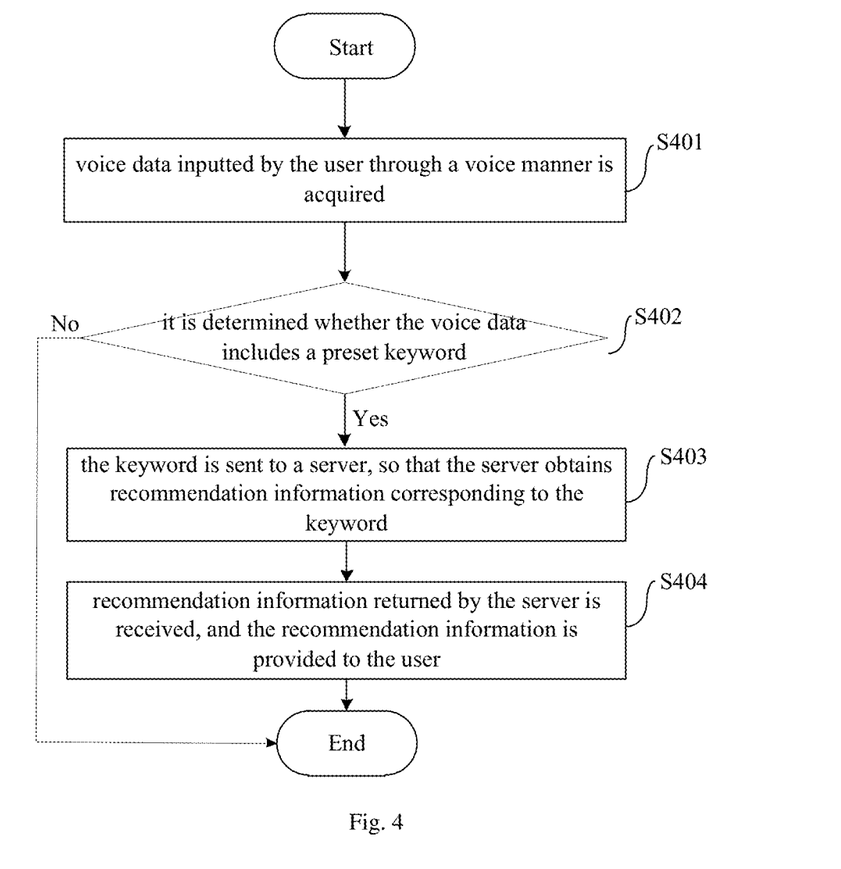
FIG. 4 is a flow chart of an interactive control method for voice and video communication according to a still embodiment of the present disclosure.

FIG. 4 is a flow chart of an interactive control method for voice and video communication according to a still embodiment of the present disclosure.

As illustrated in FIG. 4, the interactive control method for voice and video communication includes followings.

At block S401, voice data inputted by the user in a voice manner is acquired.

In detail, during the voice or the video call between the user and one or more other users, the voice data inputted by the user can be monitored.

At block S402, it is determined whether the voice data includes a preset keyword.

In detail, after the voice data inputted by the user is obtained, the voice data may be recognized by the related art, and it is determined whether a recognition result includes the preset keyword.

At block S403, when the preset keyword is included, the preset keyword is sent to a server, so that the server obtains recommendation information corresponding to the preset keyword.

At block S404, recommendation information returned by the server is received, and the recommendation information is provided to the user.

For example, during the video call between the user A and user B, the keyword in chat voice can be recognized and sent to the server constantly. The server analyzes the keyword in recent time (for example, five minutes) to recognize a chat topic of chat parties. Assuming that high frequency keywords appearing in the video call between the user A and the user B are "clothing", "shopping", "buying", "purchasing" etc., the server can determine that the chat topic between the users is a shopping theme, and obtain advertisements (such as e-commerce advertisements) related to the shopping theme, and return the corresponding advertisements to the terminal. The terminal receives the advertisements returned by the server and displays the advertisements at a location next to the video window or other locations.

With the interactive control method for voice and video communication provided by embodiments of the present disclosure, the user behavior data inputted by the user in the voice manner is acquired, it is determined whether the user behavior data includes the preset keyword, and when it is determined that the keyword is included, the keyword is sent to the server, and the recommendation information related to the keyword and returned by the server is received, such that, the recommendation information related to the keyword is accurately pushed to the user according to chat voice, thereby avoiding the trouble of the user manually finding the information related to keyword by himself/herself, and improving the interactive experience of the user.

During the video communication, not only the terminal can be controlled to perform some operations according to the gesture action inputted by the user, but also an object in the video can be recognized when the video information collected by the camera includes the object, and recommendation information related to the object can be recommended to the user. In this case, the user can click on the recommendation information to view the information related to the object.

Figure 5:
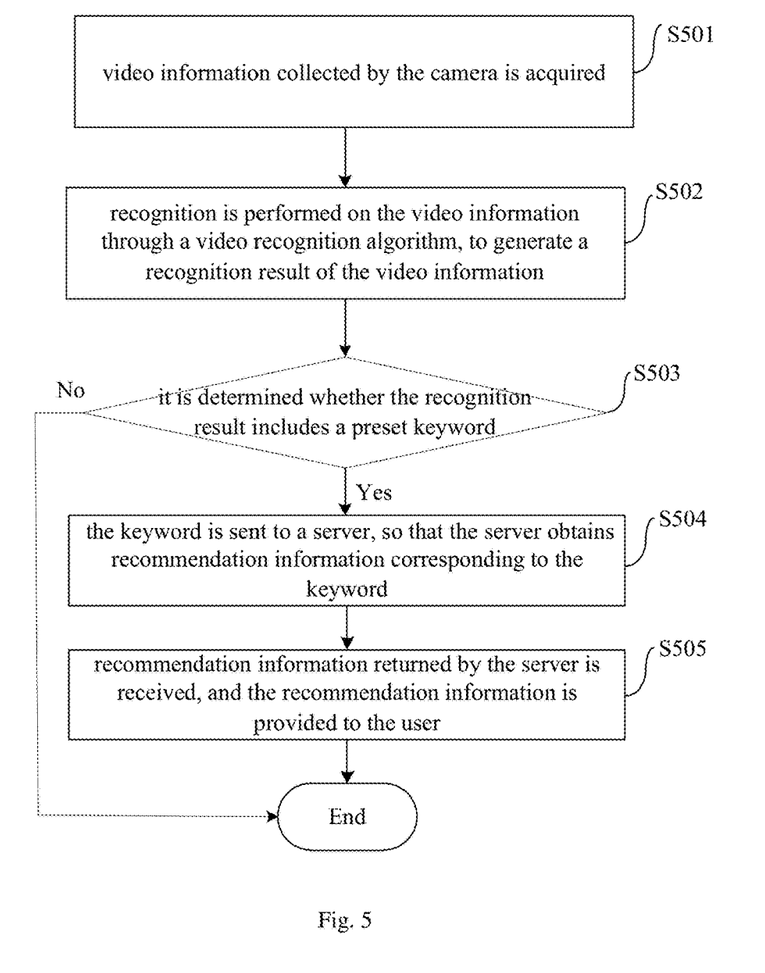
FIG. 5 is a flow chart of an interactive control method for voice and video communication according to still another embodiment of the present disclosure.

FIG. 5 is a flow chart of an interactive control method for voice and video communication according to still another embodiment of the present disclosure.

As illustrated in FIG. 5, the interactive control method for voice and video communication includes followings.

At block S501, video information collected by the camera is acquired.

At block S502, recognition is performed on the video information through a video recognition algorithm, to generate a recognition result of the video information.

In detail, during the video call, the video information collected by the camera is acquired, and the video information is recognized by the video recognition algorithm. When it is recognized that the video information includes an object, the keyword corresponding to the object is determined.

At block S503, it is determined whether the recognition result includes a preset keyword.

At block S504, when it is determined that the preset keyword is included, the preset keyword is sent to a server, so that the server obtains recommendation information corresponding to the preset keyword.

At block S505, recommendation information returned by the server is received, and the recommendation information is provided to the user.

For example, when the user A makes the video call with the user B, assuming that the user A holds an iPhone and introduces information about iPhone to the user B, the application can acquire the video information collected by the camera, and determine that the video information includes an object by recognizing the video information using the video recognition algorithm, and determine that the keyword corresponding to the object is "iPhone" by analyzing characteristic information of the object in the video. In this case, the application can send the keyword to the server, the server matches an appropriate advertisement based on the keyword and returns the corresponding advertisement. The application receives the advertisement returned by the server, and displays the advertisement on the object recognized in the video. The advertisement disappears as the object in the video disappears. Thus, when the user needs to view the information related to the object, the user can click the advertisement in the video to acquire the information related to the object.

With the interactive control method for voice and video communication provided by embodiments of the present disclosure, the video information collected by the camera is acquired, the video information is recognized, and it is determined whether the recognition result includes the preset object, when it is included, the keyword corresponding to the object is determined, the keyword is sent to the server, and the recommendation information related to the keyword and returned by the server is received, such that, the recommendation information related to the object is accurately pushed to the user, thereby avoiding the trouble of the user manually finding the information related to object by himself/herself, and improving the interactive experience of the user.

Figure 6:
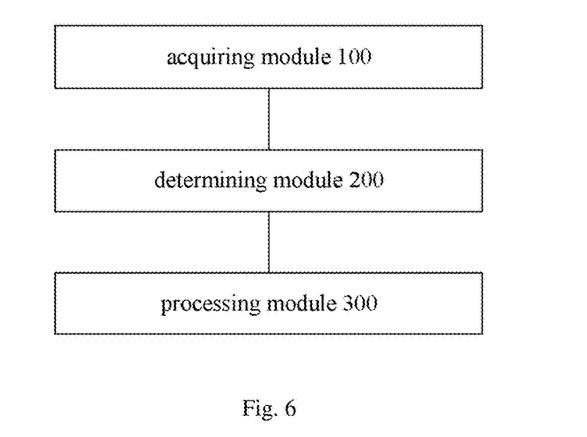
FIG. 6 is a block diagram of an interactive control device for voice and video communication according to an embodiment of the present disclosure.

FIG. 6 is a block diagram of an interactive control device for voice and video communication according to an embodiment of the present disclosure.

As illustrated in FIG. 6, the interactive control device for voice and video communication includes an acquiring module 100, a determining module 200 and a processing module 300.

The acquiring module 100 is configured to acquire user behavior data inputted by a user in a preset manner. The preset manner includes a voice manner and/or a gesture manner. The determining module 200 is configured to determine whether the user behavior data includes preset trigger information. The processing module 300 is configured to determine an operation instruction corresponding to the preset trigger information in a preset operation instruction set when the user behavior data includes the preset trigger information and to perform an event corresponding to the operation instruction.

It should be understood that, the correspondence relationship between the preset trigger information, the operation instruction and the event is stored in advance.

In an embodiment of the present disclosure, the preset trigger information may include a trigger word and an action operation word. The determining module 200 is further configured to determine whether the user behavior data includes the trigger word, and further determine whether the user behavior data includes the action operation word when the user behavior data includes the trigger word. The processing module 300 is configured to determine the operation instruction corresponding to the action operation word according to the preset operation instruction set when the user behavior data includes the action operation word and to perform the event corresponding to the operation instruction corresponding to the action operation word.

For example, during the video call between the user A and the user B, it is assumed that the reserved voice instruction (the trigger word) that triggers the application to perform some operations according to the voice data inputted by the user is "X voice assistant", i.e., when the voice data inputted by the user includes "X voice assistant", the voice data after "X voice assistant" may be recognized, to determine whether the preset action operation word is included in the voice data after "X voice assistant" inputted by the user. Assuming that the voice data currently inputted by the user and acquired by the acquiring module 100 is "X voice assistant, downloading pictures x.jpg and y.jpg from Baidu cloud, sending the downloaded pictures to the user B for his/her selection", the voice data is analyzed, and the determining module 200 determines whether the analysis result includes the trigger word, it can be determined that the voice data currently inputted by the user includes the trigger word. The determining module 200 may further determine whether the analysis result includes the preset action operation word, and it can be determined that the action operation words "downloading" and "sending" are included. In this case, the processing module 300 obtains the operation instruction corresponding to the action operation words, and performs the corresponding event according to the operation instruction, i.e., the pictures x.jpg and y.jpg are downloaded from the Baidu cloud, and then the pictures x.jpg and y.jpg are sent to the user B. Thus, the user can control the terminal to perform operations of downloading and sending the pictures in the voice manner, thereby reducing the trouble of manually downloading and sending the pictures by himself/herself.

In addition, when the processing module 300 determines the operation instruction corresponding to the action operation word according to the preset operation instruction set and performs the event corresponding to the operation instruction corresponding to the action operation word, if the processing module 300 obtains multiple events, and then the multiple events are provided to the user for confirmation.

In detail, in the process of performing according to the voice data inputted by the user, there may be a case in which the user's instruction is not clear. In this case, multiple events may be obtained when intending to perform the event according to the voice data. Therefore, it is possible to number the multiple events, and display the events, the numbers and prompt information for confirming the event, to prompt the user to confirm the event.

For example, the user's voice data is "opening a photo on the desktop", when there is a folder called "photo" and also a file "photo.jpg" on the desktop, in the process of performing according to the voice data inputted by the user, it may not be clearly determine whether the user want to open the folder "photo" on the desktop or open the file "photo.jpg" on the desktop. Therefore, in this case, two options may be displayed to the user for confirmation after analysis. In order to correctly recognize user's confirmation, it can be recognized by a confirm password of each option. Assuming that confirm text for the option of opening the folder "photo" on the desktop is "confirming photo option 1", and confirm text for the option of opening the file "photo.jpg" on the desktop is "confirming photo option 2", when the application receives the user's voice input "confirming photo option 1", the application may determine that the user needs to perform the event of opening the folder "photo" on the desktop according to the voice data currently inputted by the user, and automatically open the folder "photo" on the desktop for the user.

In addition, the preset trigger information may include a trigger gesture action and a gesture action. The acquiring module 100 is further configured to acquire the user behavior data inputted by the user through a camera. The determining module 200 is configured to determine whether the user behavior data includes the trigger gesture action, and further determine whether the user behavior data includes the gesture action when the user behavior data includes the trigger gesture action. The processing module 300 is configured to determine the operation instruction corresponding to the gesture action according to the preset operation instruction set when the user behavior data includes the gesture action and to perform a corresponding event according to the operation instruction corresponding to the gesture action.

For example, during the video call between the user A and the user B, it is assumed that the reserved action instruction that triggers the application to perform some operations according to the gesture action inputted by the user is the gesture indicating "OK", i.e., in the process of analyzing the video information collected by the camera, when it is analyzed that the video information collected by the camera includes the gesture indicating "OK", it can be determined that the video information includes the trigger action that triggers the application to perform some operations according to the gesture action inputted by the user. In this case, when it is monitored that the user inputs the gesture indicating "magnifying" after inputting the trigger action, it can be determined that the gesture action currently inputted by the user is the preset gesture action by analyzing the video information collected by the camera. In this case, the operation instruction corresponding to the gesture indicating "magnifying" can be obtained. Assuming that the operation instruction corresponding to the gesture indicating "magnifying" is an instruction to maximize the window, the application performs the event that maximizes the video window according to the operation instruction. Thus, the user can adjust the size of the video window through the gesture action during the video process, thereby reducing the trouble of manual operation of the user.

In addition, the preset trigger information may include a keyword. During the voice or video call by the user, after the acquiring module 100 acquires the voice data inputted by the user in the voice manner, the determining module 200 is further configured to determine whether the user behavior data includes a preset keyword. The processing module 300 is further configured to, when the user behavior data includes the preset keyword, send the preset keyword to a server, so that the server obtains recommendation information corresponding to the preset keyword, and to receive the recommendation information returned by the server, and to provide the recommendation information to the user.

For example, during the video call between the user A and user B, the keyword in chat voice can be recognized and sent to the server constantly. The server analyzes the keyword in recent time (for example, five minutes) to recognize a chat topic of chat parties. Assuming that high frequency keywords appearing in the video call between the user A and the user B are "clothing", "shopping", "buying", "purchasing" etc., the server can determine that the chat topic between the users is a shopping theme, and obtain advertisements (such as e-commerce advertisements) related to the shopping theme, and return the corresponding advertisements to the terminal. The terminal receives the advertisements returned by the server and displays the advertisements at a location next to the video window or other locations.

In addition, during the video call made by the user, the above trigger information may also be a keyword corresponding to an object in the video. The acquiring module 100 is configured to acquire video information collected by the camera, and to perform recognition on the video information through a video recognition algorithm, to generate a recognition result of the video information. The determining module 200 is configured to determine whether the recognition result includes a preset keyword. The processing module 300 is configured to, when the determining module 200 determines that the preset keyword is included, send the preset keyword to a server, so that the server obtains recommendation information corresponding to the preset keyword, and configured to receive the recommendation information returned by the server, and provide the recommendation information to the user.

It should be noted that, the foregoing explanation of embodiments of the interactive control method for voice and video communication is also applicable to the interactive control device for voice and video communication of the present embodiment, which is not described herein again.

With the interactive control device for voice and video communication provided by embodiments of the present disclosure, the acquiring module acquires the user behavior data inputted by the user in the voice manner and/or the gesture manner, the determining module determines whether the user behavior data includes the preset trigger information, and when it is determined that the trigger information is included, the processing module determines the operation instruction corresponding to the trigger information and in the preset operation instruction set, and performs the event corresponding to the operation instruction, such that, the user can control the terminal to perform other operations through the voice and/or the gesture during the voice or video communication, thereby avoiding the trouble of manual operation of the user and improving the interactive experience of the user.

In order to achieve the above objectives, embodiments of the present disclosure further provide an interactive control device for voice and video communication, including one or more processors, a memory and one or more modules stored in the memory. When the one or more modules are executed by the one or more processors, the one or more modules are configured to perform operations: acquiring user behavior data inputted by a user in a preset manner, in which, the preset manner includes a voice manner and/or a gesture manner; determining whether the user behavior data includes preset trigger information; and when the user behavior data includes the preset trigger information, determining an operation instruction corresponding to the preset trigger information in a preset operation instruction set, and performing an event corresponding to the operation instruction.

With the interactive control device for voice and video communication provided by embodiments of the present disclosure, the user behavior data inputted by the user in the voice manner and/or the gesture manner is acquired, it is determined whether the user behavior data includes the preset trigger information, and when it is determined that the trigger information is included, the operation instruction corresponding to the trigger information and in the preset operation instruction set is determined, and the event corresponding to the operation instruction is performed, such that, the user can control the terminal to perform other operations through the voice and/or the gesture during the voice and/or video communication, thereby avoiding the trouble of manual operation of the user and improving the interactive experience of the user.

In order to achieve the above object, embodiments of the present disclosure provide a storage medium. The storage medium is configured to store an application program. The application program is configured to perform the interactive control method for voice and video communication according to the first aspect of the embodiments of the present disclosure.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance or to imply the number of indicated technical features. Thus, features defined with "first" and "second" may explicitly or implicitly include at least one of the features. In descriptions of the present disclosure, unless specified otherwise, "a plurality of" means at least two, such as two or three.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated that the above embodiments are explanatory, and cannot be construed to limit the present disclosure. For those skilled in the art, changes, alternatives, and modifications can be made to the embodiments without departing from spirit, principles and scope of the present disclosure.

What is claimed is:

1. An interactive control method executed during voice and video communication between a user and one or more other users, comprising:
    monitoring voice data inputted by the user or video information collected by a camera during the voice or video communication between the user and the one or more other users;
    performing recognition on the voice data after acquiring the voice data or the video information, to acquire user behavior data inputted by the user in a preset manner, wherein, the preset manner comprises a voice manner;
    determining whether the user behavior data comprises preset trigger information;
    when it is determined that the user behavior data comprises the preset trigger information, further determining whether the user behavior data comprises a preset action operation word; and
    when it is determined that the user behavior data comprises the preset action operation word, determining an operation instruction corresponding to the preset action operation word in a preset operation instruction set, and performing an event corresponding to the operation instruction.

2. The method according to claim 1, wherein, the preset trigger information comprises a keyword,
    determining whether the user behavior data comprises the preset trigger information comprises: determining whether the user behavior data comprises the keyword; and
    when the user behavior data comprises the preset trigger information, determining the operation instruction corresponding to the preset trigger information in the preset operation instruction set, and performing the event corresponding to the operation instruction comprises: when the user behavior data comprises the keyword, sending the keyword to a server, so that the server obtains recommendation information corresponding to the keyword; and receiving the recommendation information returned by the server, and providing the recommendation information to the user.

3. The method according to claim 1, wherein, the preset trigger information comprises a keyword,
    acquiring the user behavior data inputted by the user in the preset manner comprises: acquiring video information collected by a camera; and performing recognition on the video information through a video recognition algorithm, to generate a recognition result of the video information;
    determining whether the user behavior data comprises the preset trigger information comprises: determining whether the recognition result comprises the keyword; and
    when the user behavior data comprises the preset trigger information, determining the operation instruction corresponding to the preset trigger information in the preset operation instruction set, and performing the event corresponding to the operation instruction comprises: when the recognition result comprises the keyword, sending the keyword to a server, so that the server obtains recommendation information corresponding to the keyword; and receiving the recommendation information returned by the server, and providing the recommendation information to the user.

4. The method according to claim 1, wherein, performing an event corresponding to the operation instruction comprises:
    obtaining a plurality of events corresponding to the operation instruction;
    displaying the plurality of events to a user for confirming one event to be performed; and
    performing the event to be performed.

5. An interactive control device executed during voice and video communication between a user and one or more other users, comprising:
    one or more processors;
    a memory;
    one or more modules stored in the memory, when executed by the one or more processors, configured to perform operations:
        monitoring voice data inputted by the user or video information collected by a camera during the voice or video communication between the user and the one or more other users;
        performing recognition on the voice data after acquiring the voice data or the video information, to acquire user behavior data inputted by the user in a preset manner, wherein, the preset manner comprises a voice manner;
        determining whether the user behavior data comprises preset trigger information;
        when it is determined that the user behavior data comprises the preset trigger information, further determining whether the user behavior data comprises a preset action operation word; and
        when it is determined that that the user behavior data comprises the preset action operation word, determining an operation instruction corresponding to the preset action operation word in a preset operation instruction set, and performing an event corresponding to the operation instruction.

6. The device according to claim 5, wherein, the preset trigger information comprises a keyword,
    determining whether the user behavior data comprises the preset trigger information comprises: determining whether the user behavior data comprises the keyword; and
    when the user behavior data comprises the preset trigger information, determining the operation instruction corresponding to the preset trigger information in the preset operation instruction set, and performing the event corresponding to the operation instruction comprises: when the user behavior data comprises the keyword, sending the keyword to a server, so that the server obtains recommendation information corresponding to the keyword; and receiving the recommendation information returned by the server, and providing the recommendation information to the user.

7. The device according to claim 5, wherein, the preset trigger information comprises a keyword, acquiring the user behavior data inputted by the user in the preset manner comprises: acquiring video information collected by a camera; and performing recognition on the video information through a video recognition algorithm, to generate a recognition result of the video information;

determining whether the user behavior data comprises the preset trigger information comprises: determining whether the recognition result comprises the keyword; and when the user behavior data comprises the preset trigger information, determining the operation instruction corresponding to the preset trigger information in the preset operation instruction set, and performing the event corresponding to the operation instruction comprises: when the recognition result comprises the keyword, sending the keyword to a server, so that the server obtains recommendation information corresponding to the keyword; and receiving the recommendation information returned by the server, and providing the recommendation information to the user.

8. The device according to claim 5, wherein, performing an event corresponding to the operation instruction comprises:

obtaining a plurality of events corresponding to the operation instruction;

displaying the plurality of events to a user for confirming one event to be performed; and performing the event to be performed.

9. A non-transitory storage medium, configured to store an application program, wherein the application program is configured to perform an interactive control method for executed during voice and video communication between a user and one or more other users, comprising:

monitoring voice data inputted by the user or video information collected by a camera during the voice or video communication between the user and the one or more other users;

performing recognition on the voice data after acquiring the voice data or the video information, to acquire user behavior data inputted by the user in a preset manner, wherein, the preset manner comprises a voice manner;

determining whether the user behavior data comprises preset trigger information;

when it is determined that the user behavior data comprises the preset trigger information, further determining whether the user behavior data comprises a preset action operation word; and when it is determined that the user behavior data comprises the preset action operation word, determining an operation instruction corresponding to the preset action operation word in a preset operation instruction set, and performing an event corresponding to the operation instruction.

10. The non-transitory storage medium according to claim 9, wherein, the preset trigger information comprises a keyword, determining whether the user behavior data comprises the preset trigger information comprises: determining whether the user behavior data comprises the keyword; and when the user behavior data comprises the preset trigger information, determining the operation instruction corresponding to the preset trigger information in the preset operation instruction set, and performing the event corresponding to the operation instruction comprises: when the user behavior data comprises the keyword, sending the keyword to a server, so that the server obtains recommendation information corresponding to the keyword; and receiving the recommendation information returned by the server, and providing the recommendation information to the user.

11. The non-transitory storage medium according to claim 9, wherein, the preset trigger information comprises a keyword, acquiring the user behavior data inputted by the user in the preset manner comprises: acquiring video information collected by a camera; and performing recognition on the video information through a video recognition algorithm, to generate a recognition result of the video information;

determining whether the user behavior data comprises the preset trigger information comprises: determining whether the recognition result comprises the keyword; and when the user behavior data comprises the preset trigger information, determining the operation instruction corresponding to the preset trigger information in the preset operation instruction set, and performing the event corresponding to the operation instruction comprises: when the recognition result comprises the keyword, sending the keyword to a server, so that the server obtains recommendation information corresponding to the keyword; and receiving the recommendation information returned by the server, and providing the recommendation information to the user.

12. The non-transitory storage medium according to claim 9, wherein, performing an event corresponding to the operation instruction comprises:

obtaining a plurality of events corresponding to the operation instruction;

displaying the plurality of events to a user for confirming one event to be performed; and performing the event to be performed.

* * * * *